(12) United States Patent
Tyshko

(10) Patent No.: US 9,680,396 B2
(45) Date of Patent: Jun. 13, 2017

(54) MULTI-VECTOR OUTPHASING DC TO AC CONVERTER AND METHOD

(71) Applicant: Alexey Tyshko, Coatesville, PA (US)

(72) Inventor: Alexey Tyshko, Coatesville, PA (US)

( * ) Notice: Subject to any disclaimer, the term of this patent is extended or adjusted under 35 U.S.C. 154(b) by 112 days.

(21) Appl. No.: 14/685,578

(22) Filed: Apr. 13, 2015

(65) Prior Publication Data

US 2016/0301327 A1 Oct. 13, 2016

(51) Int. Cl.
*H02M 7/44* (2006.01)
*H02M 7/49* (2007.01)
*H02M 1/12* (2006.01)

(52) U.S. Cl.
CPC ............... *H02M 7/49* (2013.01); *H02M 1/12* (2013.01); *H02M 7/44* (2013.01)

(58) Field of Classification Search
CPC .......... H02M 1/12; H02M 5/458; H02M 1/44; H02M 7/493; H02M 7/06; H02M 7/44; H02M 7/49; H02J 1/02; H02J 3/01; H02J 3/00

See application file for complete search history.

(56) References Cited

U.S. PATENT DOCUMENTS

| | | | | |
|---|---|---|---|---|
| 5,212,629 A * | 5/1993 | Jessee | ...................... | H02M 7/49 363/132 |
| 6,738,275 B1 * | 5/2004 | Beland | .................. | H02M 1/088 363/21.02 |
| 2006/0126242 A1 * | 6/2006 | Datta | ...................... | H02M 7/49 361/62 |
| 2008/0284252 A1 * | 11/2008 | Jones | ........................ | H02J 3/01 307/82 |
| 2009/0212631 A1 * | 8/2009 | Taylor | ..................... | H02J 9/062 307/66 |
| 2010/0133901 A1 * | 6/2010 | Zhang | ................... | H02M 5/458 307/11 |
| 2014/0265587 A1 * | 9/2014 | Garces | .................. | H02M 7/497 307/52 |
| 2016/0190809 A1 * | 6/2016 | Ma | .......................... | H02M 7/49 307/77 |

* cited by examiner

*Primary Examiner* — Gustavo Rosario Benitez
(74) *Attorney, Agent, or Firm* — Garrett James O'Sullivan

(57) ABSTRACT

DC to AC multi-vector, multi-module switch mode converter capable of producing a fully regulated quazi-sinusoidal output voltage with cancelled N odd harmonics comprises two sets of $2^N$ switch mode modules each with equal output amplitude operating with the output frequency and the means for summation of their outputs. Each switch mode module in the first set operates with its own fixed phase shift, in reference to the first module. Each module phase shift is calculated as a weighted sum of phase shifts for all harmonics to be cancelled $\Phi_n = \pi/n$, where n is a number of harmonic and weights are defined by module number. The second set of modules is identical to the first set and produces its own output voltage with cancelled N harmonics too. The output voltages of the first and second sets are proportional to the DC bus voltage. The amplitude of the combined output voltage is regulated by the variable phase shift between the output voltages of the first and the second sets. The switch mode module DC inputs of both sets may be connected to DC power bus in parallel, in series, or in groups.

4 Claims, 13 Drawing Sheets

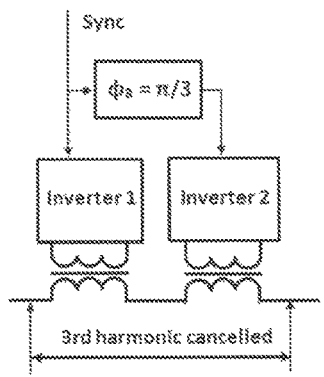
Fig. 5
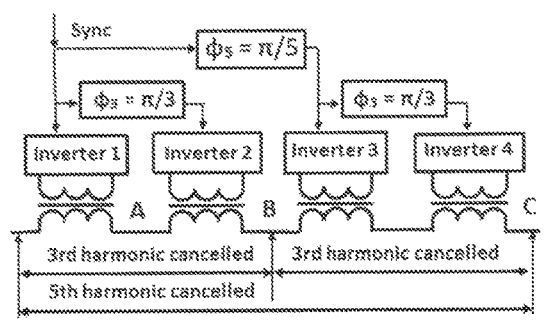
Fig. 6                Fig. 7
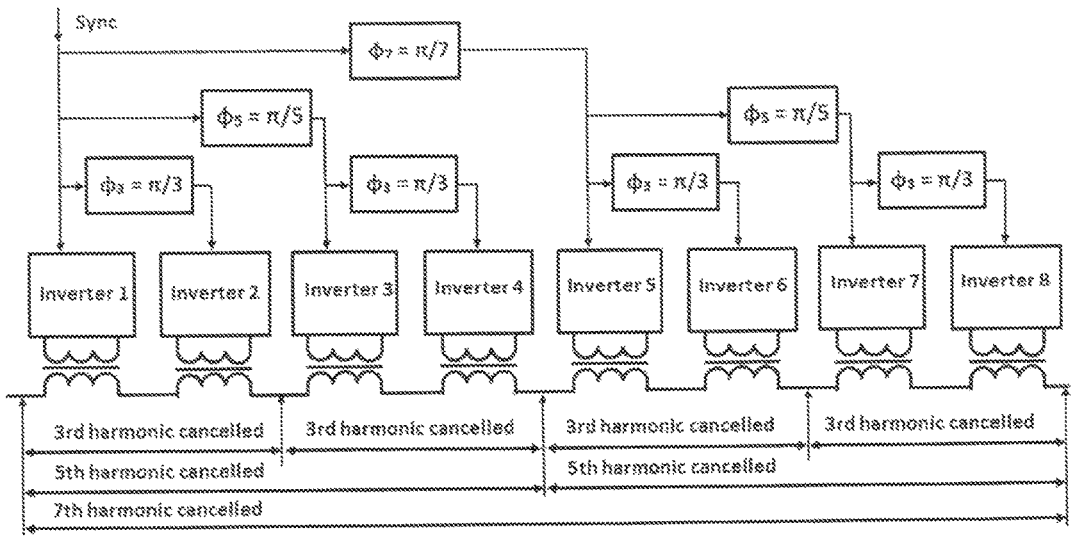
Fig. 8
To cancel N harmonics from combined output converter employs $2^N$ modules

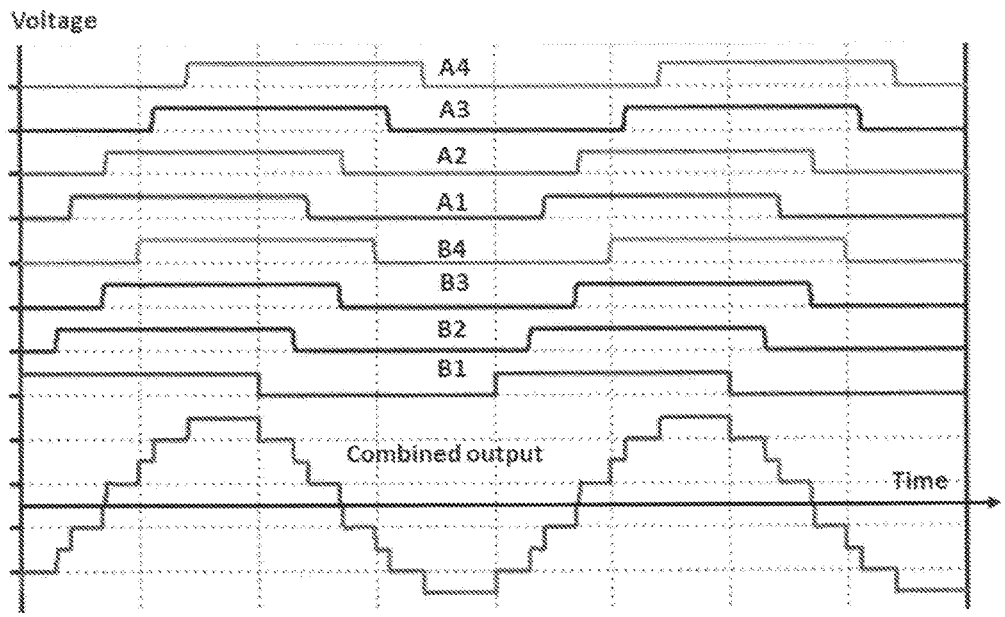

Fig. 9

| Module number, $m$ | Module assigned binary code, $c_m$ | $n^{th}$ harmonic phase shift in module | | | Total module shift formula, $\alpha_m = c_m \cdot \Phi$ | Total module shift value, $\alpha_m$ |
|---|---|---|---|---|---|---|
| | | $n=7$ | $n=5$ | $n=3$ | | |
| 1 | 000 | 0 | 0 | 0 | 0 | 0 |
| 2 | 001 | 0 | 0 | $\phi_3$ | $\phi_3$ | $\pi/3$ |
| 3 | 010 | 0 | $\phi_5$ | 0 | $\phi_5$ | $\pi/5$ |
| 4 | 011 | 0 | $\phi_5$ | $\phi_3$ | $\phi_5 + \phi_3$ | $8\pi/15$ |
| 5 | 100 | $\phi_7$ | 0 | 0 | $\phi_7$ | $\pi/7$ |
| 6 | 101 | $\phi_7$ | 0 | $\phi_3$ | $\phi_7 + \phi_3$ | $10\pi/21$ |
| 7 | 110 | $\phi_7$ | $\phi_5$ | 0 | $\phi_7 + \phi_5$ | $12\pi/35$ |
| 8 | 111 | $\phi_7$ | $\phi_5$ | $\phi_3$ | $\phi_7 + \phi_5 + \phi_3$ | $15\pi/105$ | where $\phi_7 = \pi/7$, $\phi_5 = \pi/5$, $\phi_3 = \pi/3$, and $\Phi = \{\phi_7, \phi_5, \phi_3\}$.

Fig. 10

MULTI-VECTOR OUTPHASING DC TO AC CONVERTER AND METHOD

REFERENCE TO RELATED APPLICATION

This application claims priority to U.S. Provisional Patent Application Ser. No. 61/995,523 filed Apr. 14, 2014

TECHNICAL FIELD

The present invention relates to the DC to AC conversion devices and methods, more particularly, relates to the multimodule, multi-vector high power converters with the fundamental frequency operating power switches, producing a quazi-sinusoidal output voltage with the low harmonic content, regulated from zero to the maxim voltage and capable of driving resonant loads. High power, ability to operate in the radio frequency range and simplicity of the controller make proposed method attractive for multiple fields of application including the nuclear magnetic resonance tools transmitters.

BACKGROUND OF THE INVENTION

Electrical energy conversion between DC and AC is the fundamental process involved in energy generation (photovoltaic inverters), energy distribution (High Voltage DC power links) and producing derivatives in other forms of energy such as mechanical (powering electrical motors), heating (induction ovens etc.), communications (radio transmitters) and special purposes like generating the high power high frequency pulses for nuclear magnetic resonance (NMR) tools for oil and gas well logging. Each field of application has specific requirements depending upon the operational frequency, output power and voltage levels which defy use of proper semiconductor switches—thyristors, GTO, MOSFET or IGBT type for maximum conversion efficiency affecting both total system losses and particularly power switches losses resulting in components temperature rise and hence decreased reliability.

In most cases output AC voltage has to be maintained stable within the narrow margin while DC input voltage may change in a wide range depending on the original energy source; this statement is fully applicable to the renewable energy conversion. In other applications such as radio transmitters and NMR transmitters the output AC or RF voltage is modulated with the amplitude/RF envelope forming signal with zero minimum amplitude. In both cases the definition of AC assumes the output to be the sinusoidal voltage delivered to the load with low level of unwanted higher harmonics.

High power DC to AC converters may include multiple modules (multimodule converters—MMC) with means to combine their outputs thus distributing maximum input and output voltages, dissipated power and optimizing output signal waveform (spectrum control). The industrial frequency (50 Hz/60 Hz) converters and electrical motor drives may use switches operating at higher frequencies (carrier frequencies up to few kHz) and form the output signal using single or multilevel pulse width modulation (PWM). If the carrier frequency is significantly higher than the converter output frequency (for example 60 Hz) the byproduct of the process of modulation carrier (for example 2 kHz) high frequency harmonics may be easily filtered out with the output series filter with low losses for the fundamental frequency 50 Hz/60 Hz.

Another approach in DC to AC conversion is to produce sine voltage using power switches operating with the fundamental frequency and to use a phase shift modulation (PSM) to form a "ladder voltage". Both methods may fully control shape and amplitude of the output voltage. But while the first method is not applicable to the high frequency operation due to the switching losses which are proportional to the switching frequency (carrier frequency) the second method involves uneven conduction time resulting in uneven power dissipation of individual modules. Additional disadvantage of the traditional "ladder" method is changing of the output voltage spectrum in the process of amplitude regulation and need of the complicated control circuitry computing proper timing for each module output pulse in real time based on input DC power bus voltage.

For high frequency applications the amplitude control/modulation method known as Chireix outphasing method is based on combining two sine voltages (two original vectors) with the stable amplitude and forming a sine voltage (combined vector) with the amplitude depending on the relative phase shift between them. To produce a sine voltage at the output two sine voltages (original vectors) are required. Chireix method cannot be used without the modifications in conjunction with switch mode modules and resonant loads due to presence of higher harmonics resulting in extremely high output currents charging and discharging the capacitance of the resonant load.

Proposed by P. Wilkinson Dent method of exciting the resonant loads includes generating two sequences of the rectangular pulses and combining them with the proper relative phase shift (outphasing method of vector combining) exciting the resonant load. A necessary attribute for this combining is a coupling line or filter connected between the resonant load and each of two sequence sources. This filter, preferably tuned to the fundamental frequency, is transparent to the fundamental frequency but limits the higher harmonics. Vector outphasing method provides an efficient way to generate high frequency sine signal with fully regulated amplitude. On the other side adding the output filter creates another problem related to the "saddle" frequency response of the combination of series and parallel resonant tanks forming a band pass filter. The transferring function in close vicinity of the fundamental frequency has to be flat enough to prevent spectrum of the modulation signal from distortion but at the same time higher harmonics of the rectangular pulses at the input of the filter may be amplified by side saddle horns and increase unwanted current of the converter output.

Method described in US 2013/0176140 A1 propose a mitigation of third harmonic problem. This method and topology simply remove third harmonic from each of two inverter outputs before combining. Third harmonic is removed from the spectrum of the output voltage using two additional modules with the output signals shifted 60° ($\pi/3$) in reference to the original modules. Other higher harmonics still presenting in the output voltage spectrum may still produce excessive heating, reducing total DC to AC conversion efficiency and decreasing expected lifetime of the power components. According to Arrhenius equation life expectancy is decreased twice for every additional 10 deg C. of the temperature rise. This factor is extremely important for the equipment operating in the harsh high temperature environment such as NMR tools used for oil and gas industry well logging. Any improvements in removing or keeping low unwanted harmonics in the converter output voltage have significant positive impact on the converter/transmitter reliability and operational and maintenance cost.

BRIEF DESCRIPTION OF THE DRAWINGS

The specific embodiment of the DC to AC converter based on the present invention and used as NMR transmitter, principles of operation and related signal waveforms are disclosed in the following drawings:

FIG. 5 shows a table with phase shift values needed for proper harmonics cancelling.

FIG. 6 shows illustrative block diagram of 2 inverters with the transformer combining of the output voltages with phase shift π/3 cancelling $3^{rd}$ harmonic in the output voltage.

FIG. 7 shows illustrative block diagram of the 4 inverter configuration cancelling both $3^{rd}$ and $5^{th}$ harmonic in the output voltage.

FIG. 8 shows illustrative block diagram of 8 inverter configuration used to produce the output voltage with cancelled $3^{rd}$, $5^{th}$ and $7^{th}$ harmonics.

FIG. 9 shows illustrative waveforms at the outputs of eight individual inverters and resulting combined output waveform.

FIG. 10 shows an example of calculating total phase shift for 8 modules that cancel 3 harmonics: the third, the fifth, and the seventh.

Figure 1:
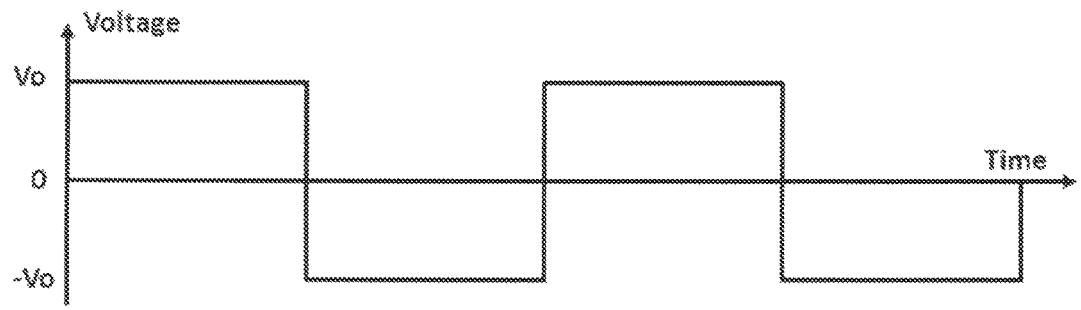
FIG. 1 shows illustrative output waveform of the switch mode inverter with 50% duty cycle most commonly used in DC to AC conversion.

It should be understood, however, that the specific embodiments given in the drawings and detailed description thereto do not limit the disclosure, but on the contrary, they provide the foundation for one of ordinary skill to discern the alternative forms, equivalents, and modifications that are encompassed with the given embodiments by the scope of the appended claims.

DETAILED DESCRIPTION

Disclosed multi-vector outphasing DC to AC converter and method are best understood in two illustrative applications such as high power industrial frequency DC to AC converter with multiple eliminated harmonics and synthesized sinusoidal voltage proportional to the DC bus voltage shown on FIG. 1 to FIG. 11 and a converter with fully regulated output voltage used as NMR transmitter shown on FIG. 12 to FIG. 27.

The most efficient way to generate AC voltage from DC is based on the switch mode inverters and the best topology is a full bridge utilizing switches maximum voltage and current ratings. Symmetrical 50% duty cycle operation creates only odd harmonics in the output spectrum: Total switch power dissipation has two main components—conduction losses and switching losses. To minimize switching losses especially for the high frequency inverters switch operation with the fundamental frequency is used.

FIG. 1 shows 50% duty cycle AC output voltage produced by the full bridge inverter operating from DC power bus with voltage Vo. This signal may be described as Fourier series combination of multiple harmonics where n is a number of harmonic and δ is a phase.

Figure 2:
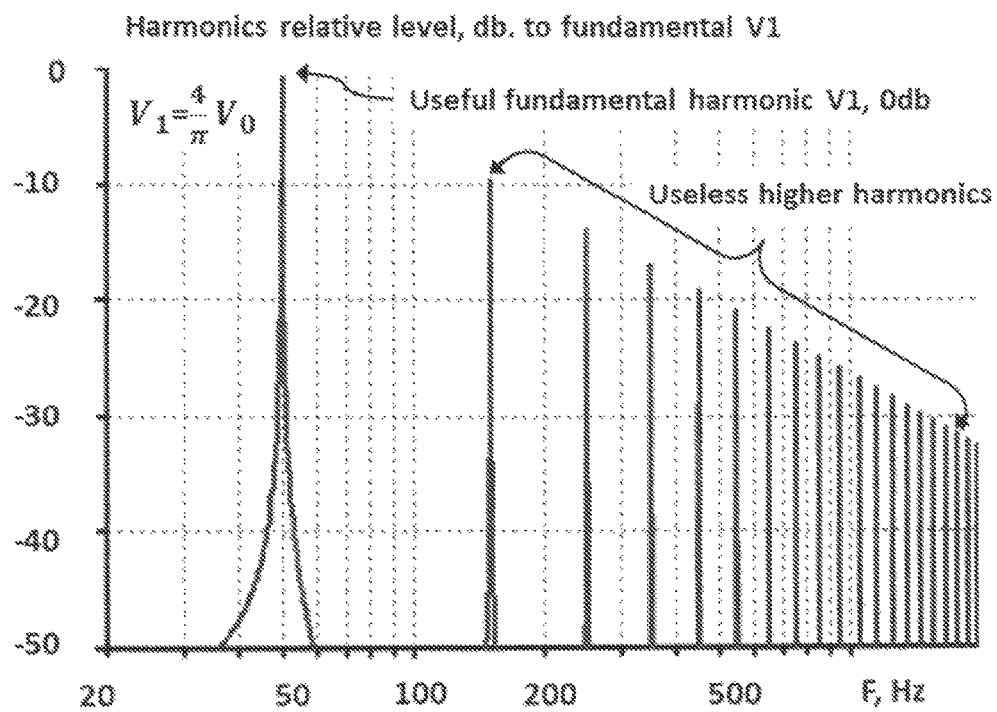
FIG. 2 shows illustrative relative to the fundamental spectrum of FIG. 1 voltage.

Spectrum of FIG. 1 periodical signal is shown on FIG. 2 with the amplitude of the first harmonic $V_1$ $$V_1 = \frac{4}{\pi}V_0$$

Amplitude of any other harmonic $V_n$ depends on its number n as $$V_n = \frac{4}{\pi n}V_0$$

DC to AC converter is expected to deliver a sinusoidal voltage to the output. It means only the first, fundamental harmonic is valuable, all other higher harmonics are useless and their presence in the output voltage only increases total power losses.

Figure 3:
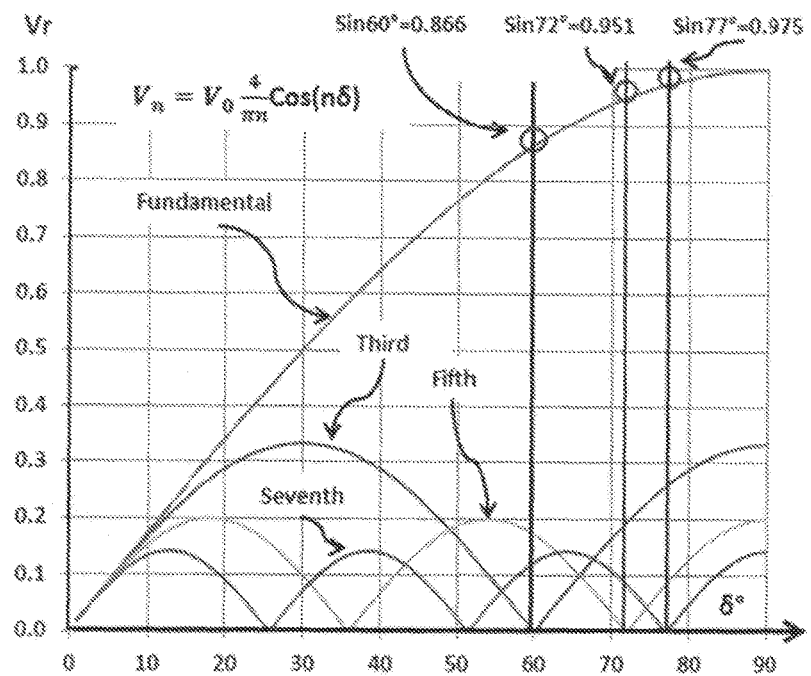
FIG. 3 shows an illustrative values of $1^{st}$, $3^{rd}$, $5^{th}$ and a $7^{th}$ harmonics as a function of the pulse width δ (90 degrees of the horizontal axis represent half of the period).

FIG. 3 shows illustrative example amplitudes of the first seven odd harmonics starting with the fundamental and named harmonics amplitude dependence upon the width of the pulse δ if pulse width is different from the 50% duty cycle shown on FIG. 1. The horizontal axis shows the modulation angle δ (often known as the modulation parameter) in the range from zero to 90. Zero δ corresponds to zero pulses generated and 90 corresponds to the 50% duty cycle pulse or modulation parameter equal one, where both positive and negative pulses $T_{pulse}$ with amplitude +/−Vo are occupying each half of the period $T_{total}$.

$$\delta = 180 T_{pulse}/T_{total}$$

Every harmonic has its maximum value for 50% duty cycle pulse duration but the fundamental one has only one maximum at δ=90, other harmonics have multiple points corresponding to the minimum or maximum, depending on the harmonic number. If pulse duration is decreasing the amplitude of some harmonics may go to zero and disappear from the pulse spectrum. Such points are shown on FIG. 3 for third harmonic at δ=60°, for fifth harmonic α=72 and seventh harmonic α=77 according to expression $$\mathrm{Sin}(n\delta)=0$$

First harmonic curve indicates the value of the first harmonic decreases from 1.000 to 0.886 or 0.951 or 0.975 respectively shown for α equal 60°, 72° and 77° respectively.

Figure 4:
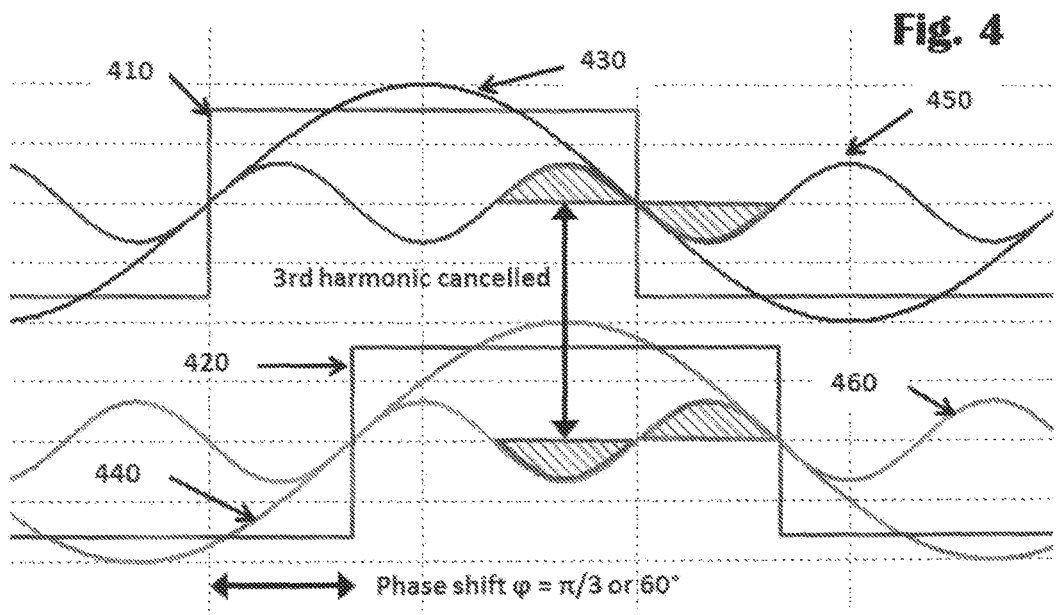
FIG. 4 shows original 50% duty cycle waveform and $1^{st}$ and $3^{rd}$ harmonics and the phase shift method of the $3^{rd}$ harmonic cancelling.

FIG. 4 shows an example of how first 50% duty cycle signals 410 with its fundamental harmonic 430 and third harmonic 450 and second identical amplitude signal 420 with its fundamental harmonic 440 and third harmonic 460 may be combined (added in series) with the phase shift of π/3 or 60 deg between pulses resulting in third harmonic cancellation. Resulting fundamental harmonic amplitude increased from 0.866 shown on FIG. 3 for 60° resulting angle to 2×0.866=1.732.

FIG. 5 shows a table with the phase shift value needed for two identical signals to cancel unwanted harmonic from their combined output. This table may be extended and phase shift calculated to cancel any harmonic following a simple expression $$\phi_n = \pi/n$$

Cancelling a single harmonic also cancels number of higher harmonics with multiple frequencies: for example cancelling $3^{rd}$ harmonic removes harmonics with numbers 9, 15, 21 etc. from the output voltage spectrum.

FIG. 6 shows illustrative block diagram of two module/inverter combination generating 50% duty cycle output voltages and combining them with π/3 phase shift resulting in the output without the third harmonic as it was described previously.

Combined signal of FIG. 6 configuration does not have third harmonic and proposed method makes next step shown on FIG. 7 It employs two identical combined signals without third harmonic and combines them with the phase shift needed for next higher harmonic according to FIG. 5 table. New more complicated DC to AC converter has four inverters and 3 different delay circuitries operating inverter controls. If output voltage is picked at point A inverter 1 output, it has all harmonics shown on FIG. 2; point B output voltage does not have third harmonic, and resulting output at point C does not have both above mentioned harmonics (example is based on the sequential cancellation of unwanted harmonics starting with the third one and up).

FIG. 8 shows illustrative preferable topology for DC to AC converter based on switch mode inverters. Converter produces combined quazi-sinusoidal output voltage with cancelled $3^{rd}$, $5^{th}$ and $7^{th}$ harmonics using 8 modules A1-A4 and B1-B4 with phase shifted outputs as shown on FIG. 9. Such topology paves a way of producing the high power high voltage output with any number of harmonics cancelled depending only on the number of used modules/inverters. The control circuitry for proposed method and topology includes simple fixed delay outputs with the time/phase shift values pre-calculated as shown on FIG. 10.

Theoretical explanation of proposed method is based on summation of multiple identical vectors generated by the identical modules. The shape and the amplitude of each generated voltage/vector are the same, while the difference is only in the phase shift being the defining parameter of the individual vector.

FIG. 10 table demonstrates the calculation of fixed phase shifts for DC to AC converter that cancels three higher harmonics: $3^{rd}$, $5^{th}$ and $7^{th}$. Total number of modules M required for cancelling those harmonics is equal to $2^N=8$. In the table the first column represents a natural number m of module; the second column represents a binary code $c_m$ assigned to the module. Assigned binary code is an N-component vector with binary representation of the module number minus one; i.e. the first module has code [000], the last—[111]. The columns 3-5 show whether the phase shift $\phi_n$ of each harmonic n to be cancelled is included into the total phase shift $\alpha_m$ of a particular module m. The phase shift $\phi_n$ is calculated as $\phi_n = \pi/n$, where n is a number of harmonic to be cancelled. Therefore the total phase shift $\alpha_m$ for module is a scalar product of the module's assigned binary code and the vector of phase shifts—a sum of phase shifts $\phi_n$ multiplied by the respective digit from assigned binary code, as shown in column 6. For example, module with number 4 has assigned binary code 011. Total phase shift $\alpha_4$ will be calculated as $$\alpha_4 = \{0,1,1\} \cdot \{\phi_7, \phi_5, \phi_3\} = 0 \cdot \phi_7 + 1 \cdot \phi_5 + 1 \cdot \phi_3 = \phi_5 + \phi_3$$

Column number 7 shows calculated total shift values for each module in radians.

This method provides a simple way to design a control circuitry for cancelling of any number of harmonics, including non-sequential.

Figure 11:
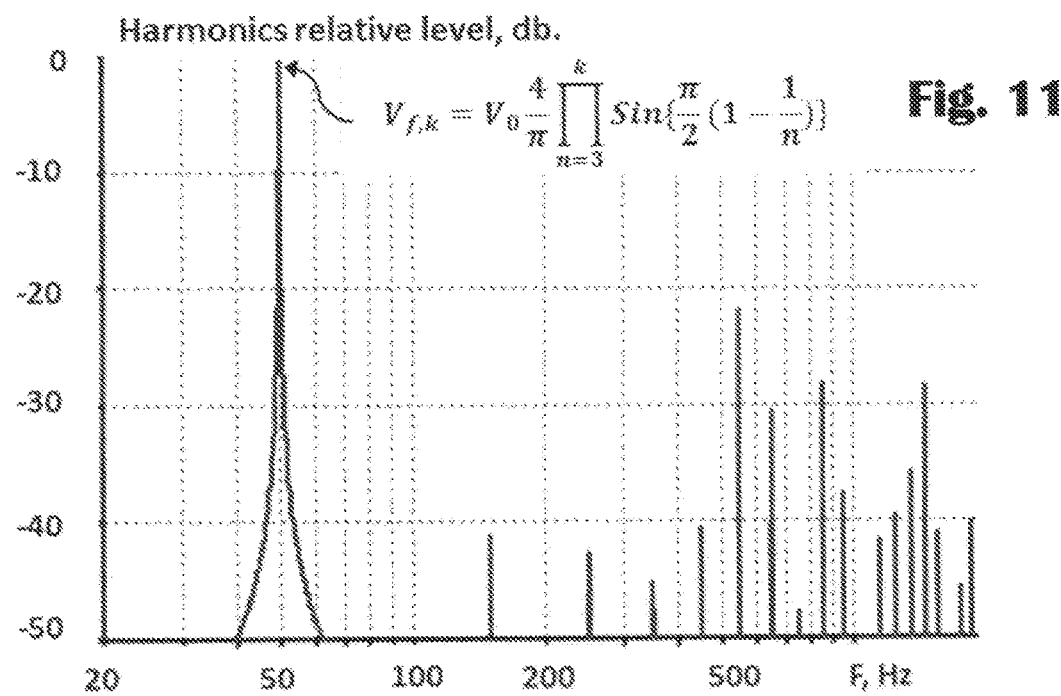
FIG. 11 shows combined output voltage spectrum relative to the fundamental harmonic in db after cancelling $3^{rd}$, $5^{th}$ and $7^{th}$ harmonic FIG. 9 and provide expression for the fundamental harmonic value calculation after phase shifted signals combined.

FIG. 11 shows the resulting spectrum of FIG. 9 combined output voltage with cancelled $3^{rd}$, $5^{th}$, $7^{th}$ and $9^{th}$ harmonics to the levels under 1% or −40 db level of the fundamental harmonic and final value of the fundamental harmonic $V_{f,k}$ after removing of total k harmonics.

Combined output voltage of the above described multi-module converter may have any desired spectral cleanness depending upon required harmonics cancelled. However the output voltage amplitude is proportional to the power bus voltage and due to the simple fixed phase shift controls can't be regulated without distorting of the output voltage spectrum.

Figure 12:
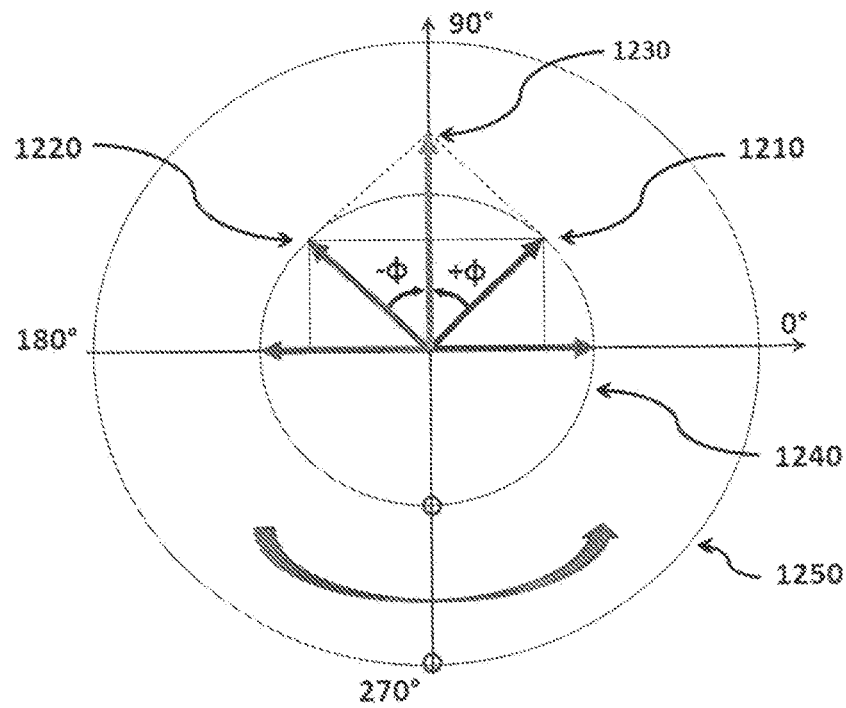
FIG. 12 shows the phasor diagram illustrating Chireix outphasing method used originally for the radio transmitter amplitude modulation.

FIG. 12 shows illustrative phasor diagram of combining two sine voltages, vector 1210 and vector 1220 of the same module (amplitude) 1240, into resulting vector 1230. Combined signal vector 1230 amplitude depends upon the phase shift +/−φ of originally opposite vectors and may be changed from zero to double 1250 value. Initial phase shift φ=90° produces zero output voltage, phase shift φ=0 produces double voltage.

For symmetrical phase shifts +/−φ phase position of the resulting combined vector does not change (is stable) during the process of the amplitude regulation.

Figure 13:
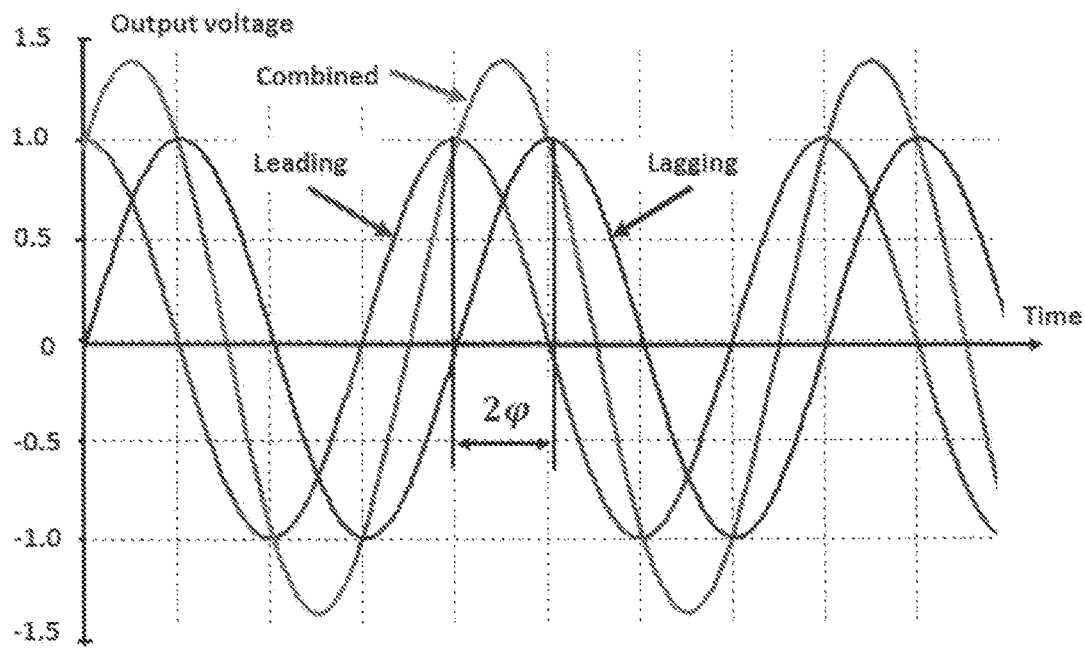
FIG. 13 shows Chireix outphasing method operation in the time domain.

FIG. 13 shows the same combining of leading and lagging sine voltages in the time domain. Relative phase shift 2 φ controls combined output voltage amplitude. This method, known as outphasing modulation, was developed by Chireix for amplitude modulation of the radio transmitter output power and used to deliver high power high frequency excitation to the resonant antenna systems.

The following is an illustrative description of the preferred embodiment of the high frequency multi-module multi-vector DC to AC converter used as a transmitter in the NMR downhole logging tools and explains the advantages of the invention. This is only one example of the possible applications in diversified fields of technology. It is assumed that artisan skilled in electronics can use described topology and ideas to satisfy specific design requirements with multiple possible modifications while still employing proposed ideas.

This explanation does not have a purpose to go deep into NMR physics but to show the origin of specific requirements for operation of the NMR transmitter with the resonant load and effect of the modulation on the topology and signal spectrum.

Figure 14:
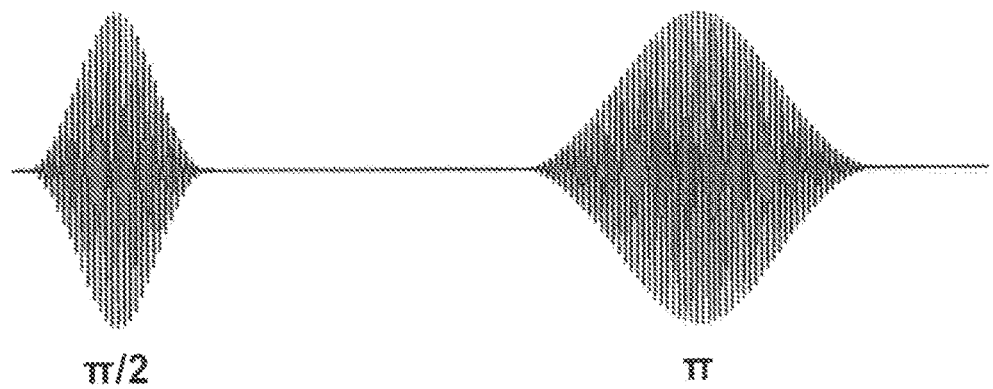
FIG. 14 shows illustrative NMR RF pulse train commonly used for antenna excitation. Only two first pulses—π/2 pulse and first of multiple π pulses are shown.

FIG. 14 shows illustrative output voltage $\pi/2$ and $\pi$ pulses produced by the transmitter and delivered to the NMR antenna, used for excitation of the hydrogen nuclei in the formation being evaluated. Pulse sequence starts with a single shorter pulse $\pi/2$ intended to produce 90° rotation of the magnetic moments of the hydrogen nuclei and multiple of $\pi$ pulses with double duration producing 180° flipping of the magnetic moment (refocusing pulses). NMR signal reaches maximum in the middle of the time between $\pi$ pulses sequence where they are measured providing information no other indirect method can do including information on porosity, porosity distribution, type of formation fluid, viscosity etc. To get this information with high accuracy generated by transmitter pulses shall be of the same optimal amplitude for the wide range of the formation and well continuously changing conditions such as temperature, well filling fluid and formation conductivity and pressure.

Figure 15:
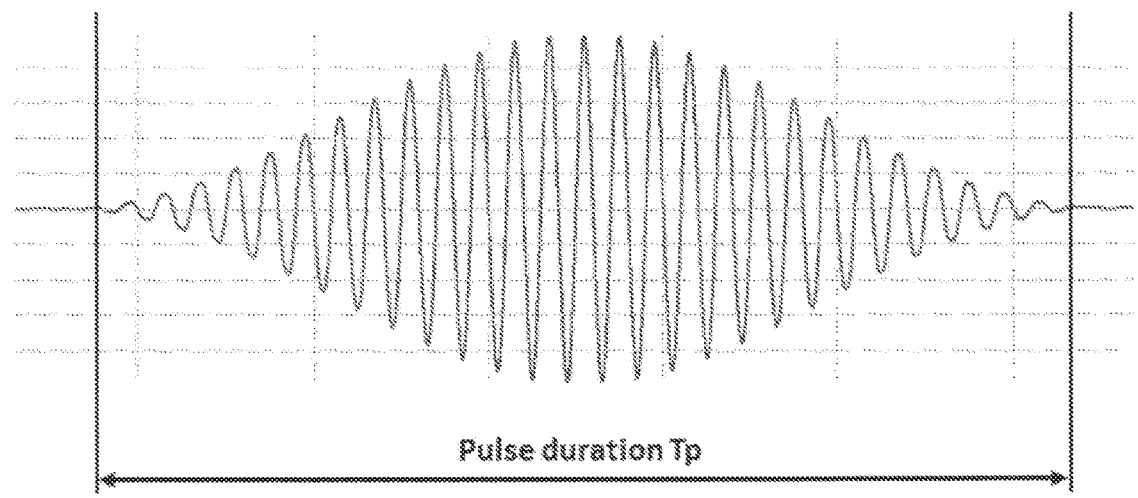
FIG. 15 shows scaled single excitation RF pulse modulated with Hann envelope.

FIG. 15 shows a single pulse with duration $T_p$ and pulse envelope representing Hann function, some other envelopes may be used such as rectangular or trapezoidal. Each pulse amplitude and envelope shall be reproduced with high accuracy both amplitude and stability of the phase of the voltage and resulting antenna current for optimal excitation of certain sensitive area and right 180° refocusing.

To excite NMR antenna the transmitter has to generate high power, high frequency pulses with very high efficiency, have stable modulation characteristic with minimum phase deviation, low output impedance and at the same time be capable to drive the resonant load. Any power dissipated by transmitter components in the high density electronic section inside the pressure housing increases components temperature and reduces tool life time and reliability. Switch mode converters are well suited for this task and outphasing amplitude control method satisfies phase stability requirements.

Figure 16:
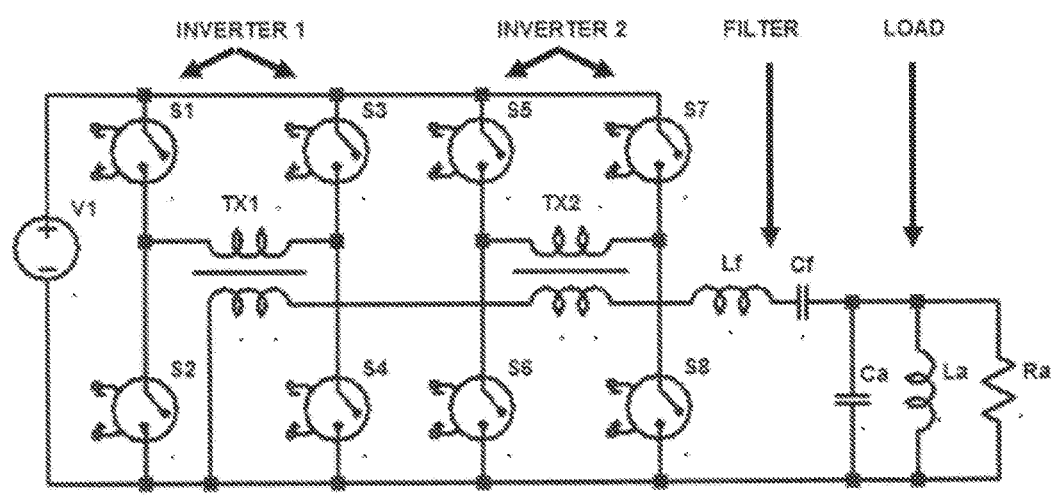
FIG. 16 shows a conventional way to generate excitation pulses using two efficient switch mode inverter 1 and inverter 2, series filter and resonant antenna.

FIG. 16 shows illustrative DC to AC converter used as a transmitter employing two switch mode modules (inverters S1-S4 and S5-S6), their output transformers TX1 and TX2, output filter Lf, Cf and resonant load (antenna for NMR tool La, Ca, Ra). Outputs of both modules/inverters are connected in series and phase shift between rectangular output voltages may be regulated. Combined output voltage is applied to the filter and finally excites the resonant load.

Figure 17:
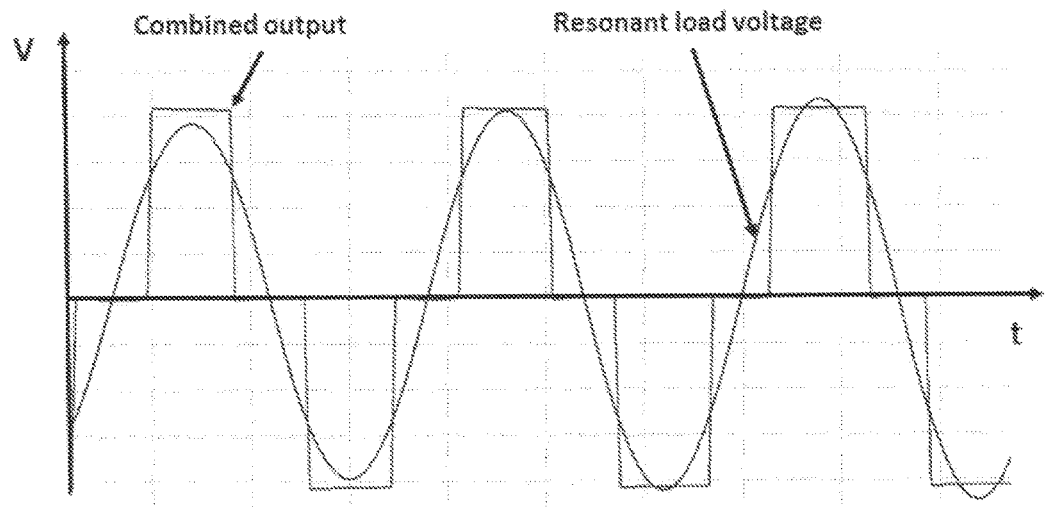
FIG. 17 shows combined output voltage applied to the series filter and restored first harmonic voltage at the resonant load (antenna) based on FIG. 16 topology.

FIG. 17 shows combined output waveform of the rectangular shape with changing pulse width and resulting sinusoidal voltage restored at the resonant load.

Figure 18:
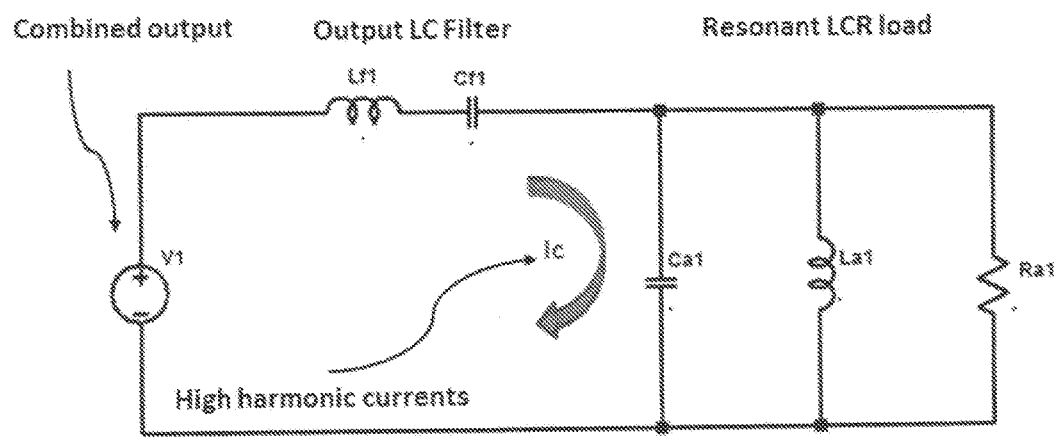
FIG. 18 shows an equivalent circuitry representing the inverter load including a series filter and resonant load (antenna) forming a band pass filter.

FIG. 18 shows the equivalent schematic that represents a transmitter comprising the converter, output Lf1, Cf1 filter and resonant La1, Ca1 and Ra1 load. It is assumed that transmitter operating frequency is close to the resonant frequency of the load. For the fundamental harmonic, antenna at resonance has high impedance equal to the parallel resistor Ra1 representing NMR antenna losses due to the well mud and formation conductivity. For higher harmonics antenna behaves as a capacitance with low impedance decreasing with frequency and higher harmonics current Ic flows through capacitor Ca1. Higher harmonics voltage components create higher harmonics currents limited mostly by the filter inductor Lf1. High efficiency/low output impedance switch mode converters can't drive capacitive load directly without the special means limiting the load capacitance charging current. This is a reason why a series LC filter between the switch mode converter and a resonant or a capacitive load is required. To minimize filter impedance for the fundamental harmonic and make output voltage less dependable on the Q factor of the resonant load, the series LC filter is tuned to the resonant frequency. Resulting combination of the series and parallel resonant tanks makes a classic band pass filter.

Figure 19:
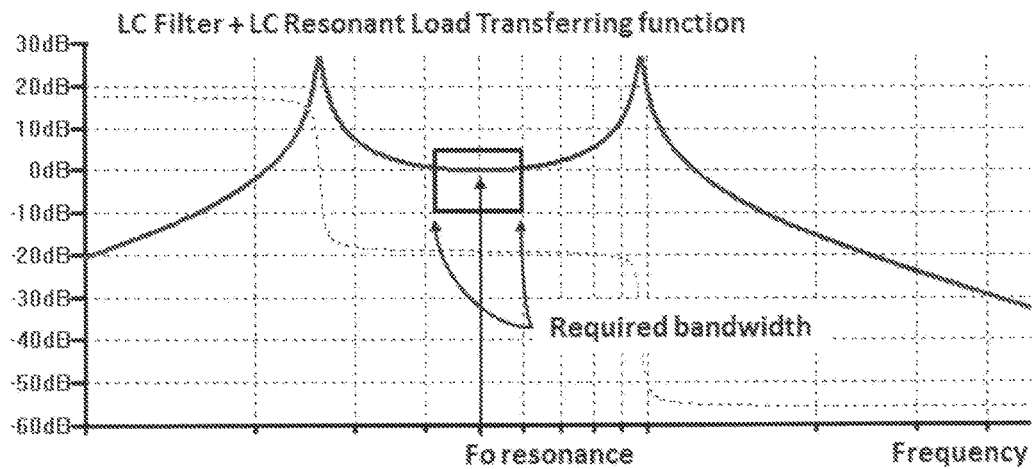
FIG. 19 shows the transferring function of the bandpass filter with a flat central area required for non-distorting restoring of the pulse envelope.

FIG. 19 shows a transferring function of the FIG. 18 schematic. If DC to AC converter task is to provide stable or slowly changing sinusoidal output voltage, then the additional side band components of the resulting spectrum of the output voltage in the vicinity of the fundamental harmonic Fo are located close to the operating frequency, and required filter bandwidth may be narrow. But for NMR application RF pulse duration may be under 50 us, which requires filter with the flat bandwidth, for example 60 kHz to 100 kHz to pass, to pass at least 3 to 5 envelope spectrum forming side band components and not to distort pulse envelope recovered at the resonant antenna. Wide band filter requires low inductance of the antenna filter.

Figure 20:
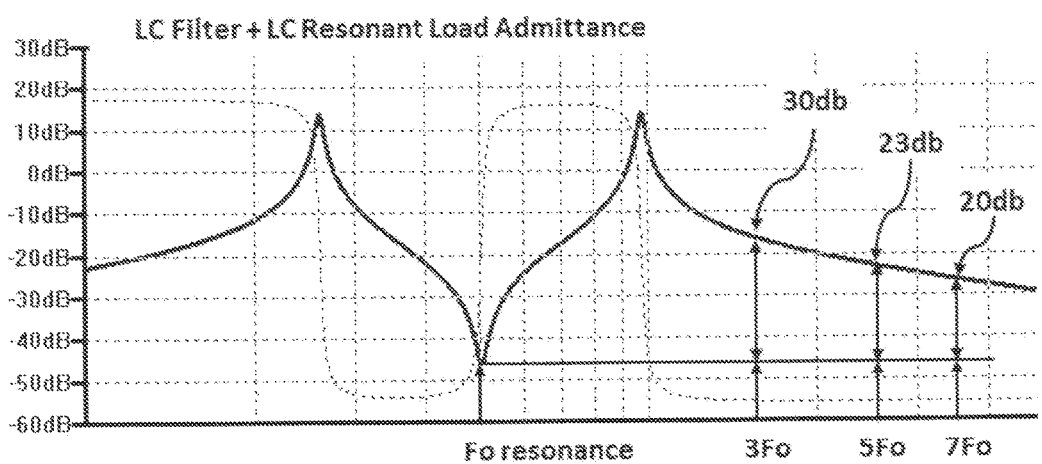
FIG. 20 shows an admittance of the resulting load.

FIG. 20 shows illustrative admittance characteristic of the output filter plus the resonant load. It demonstrates a significant increase in the admittance and resulting current for higher harmonics up to 30 db for $3^{rd}$, 23 db for $5^{th}$, and 20 db for $7^{th}$ harmonics compared to the fundamental harmonic calculated for illustrative equivalent schematic.

Figure 21:
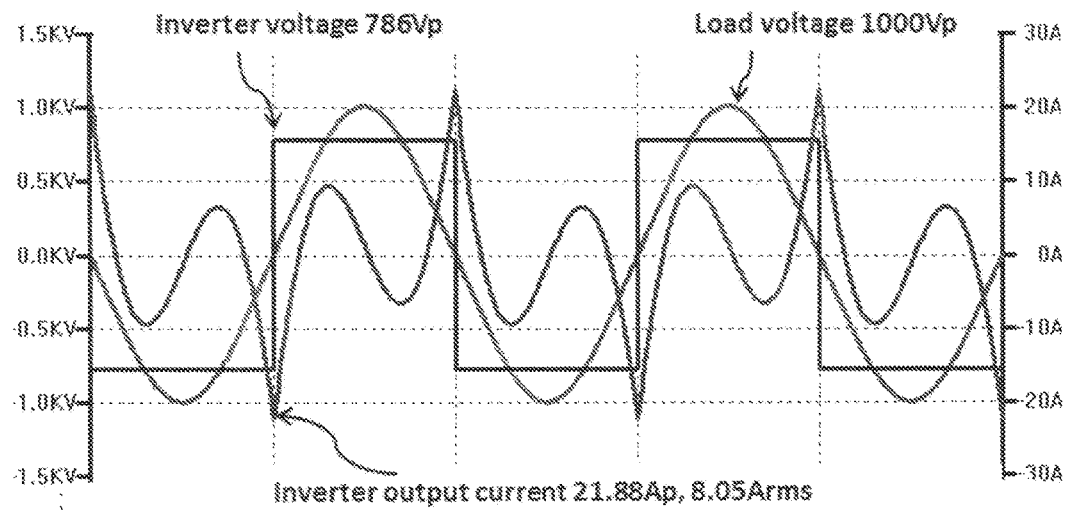
FIG. 21 shows a simple 50% duty cycle inverter output voltage applied to the load, restored 1000 Vp sinusoidal load voltage and inverter output current.
Figure 24:
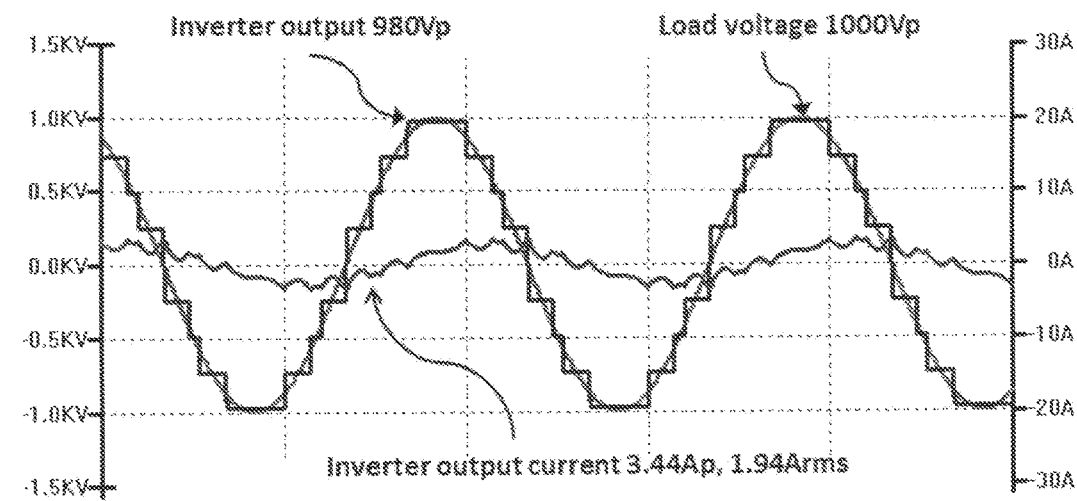
FIG. 24 shows inverter output voltage with cancelled $3^{rd}$, $5^{th}$ and $7^{th}$ harmonics, resulting sine load voltage and inverter output current.

FIG. 21 shows illustrative DC to AC converter output voltage waveform for a simple 50% duty cycle converter of FIG. 1 required to produce 1000 Vp load voltage and resulting converter output current of 21.88 Ap and 8.05 Arms based on FIG. 24 shown admittance. Most of the output current conduction losses are caused by the higher harmonics.

Figure 22:
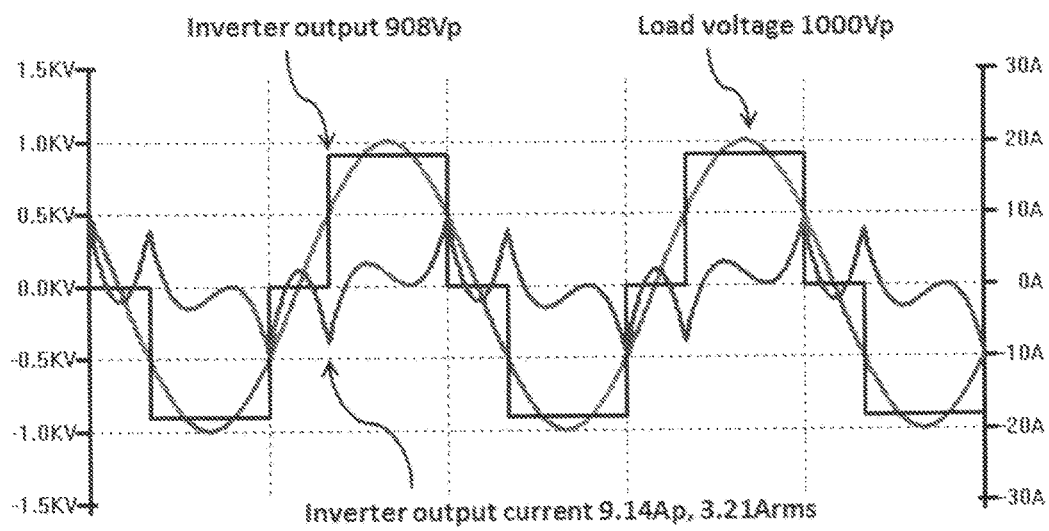
FIG. 22 shows inverter output voltage with cancelled $3^{rd}$ harmonic, resulting sine load voltage and inverter output current.

FIG. 22 shows another DC to AC converter output waveform based on the FIG. 6 topology. Load voltage is the same 1000 Vp but converter output current is decreased to only 9.14 Ap and 3.21 Arms—2.5 times lower, while thermal effect proportional to the square of the rms current is 6.25 times less.

Figure 23:
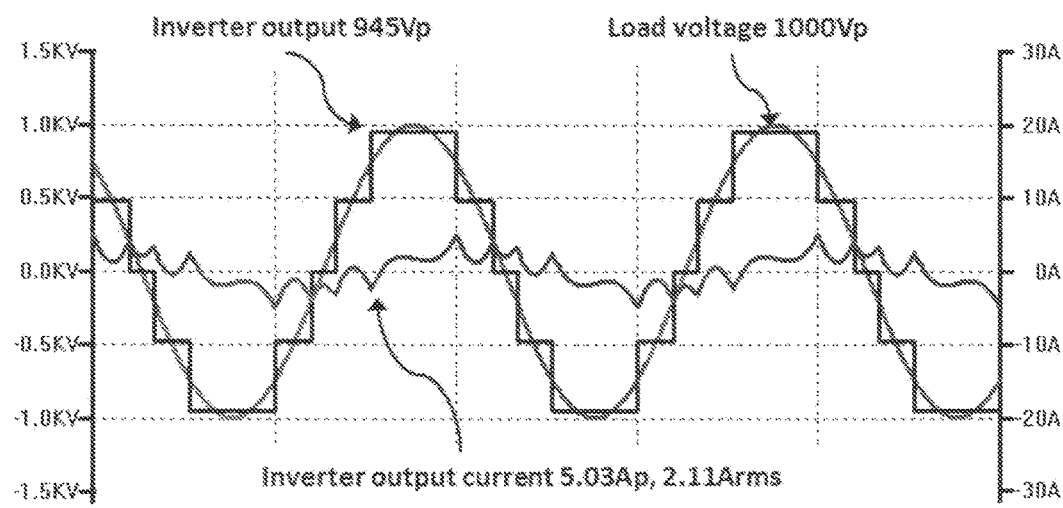
FIG. 23 shows inverter output voltage with cancelled $3^{rd}$ and $5^{th}$ harmonics, resulting sine load voltage and inverter output current.

FIG. 23 shows the output voltage and output current of DC to AC converter based of FIG. 7 topology with the same load voltage; output current drops to 5.03 Ap and 2.11 Arms.

FIG. 24 shows the output voltage and output current of DC to AC converter based of FIG. 8 topology with the same load voltage; output current drops to 3.44 Ap and 1.94 Arms.

Figure 25:
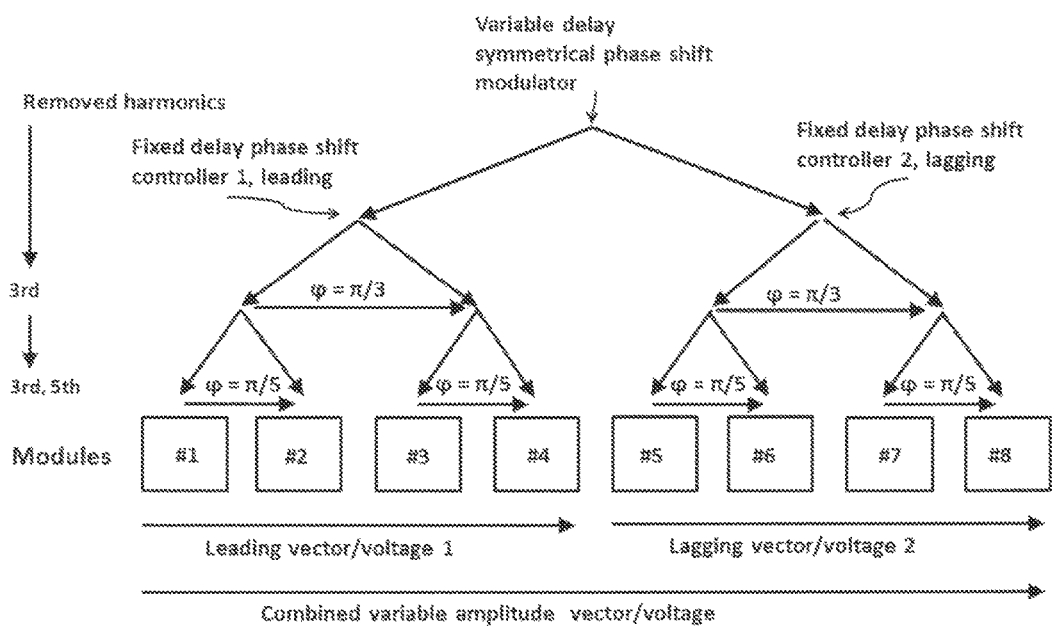
FIG. 25 shows a diagram of method of forming two sets of voltages (leading and lagging) with cancelled $3^{rd}$ and $5^{th}$ harmonics with the fixed phase shifts and combining all voltages into the fully regulated output voltage.

FIG. 25 shows a DC to AC multi-vector converter topology comprising two sets of the fixed phase shift multimodule converters and operating with the variable phase shift between those sets. In this example, first set of 4 modules (#1 to #4) produces a quazi-sinusoidal leading voltage vector with $3^{rd}$ and $5^{th}$ harmonics cancelled, while the second set of 4 modules (#5 to #8) produces lagging voltage vector with the same harmonics cancelled. Both vectors/voltages are combined into the output voltage of the variable amplitude; the amplitude is controlled by the variable phase control signals from the symmetrical phase shift modulator. All power switches in the modules operate with the fundamental frequency which guarantees minimum possible switching losses.

Figure 26:
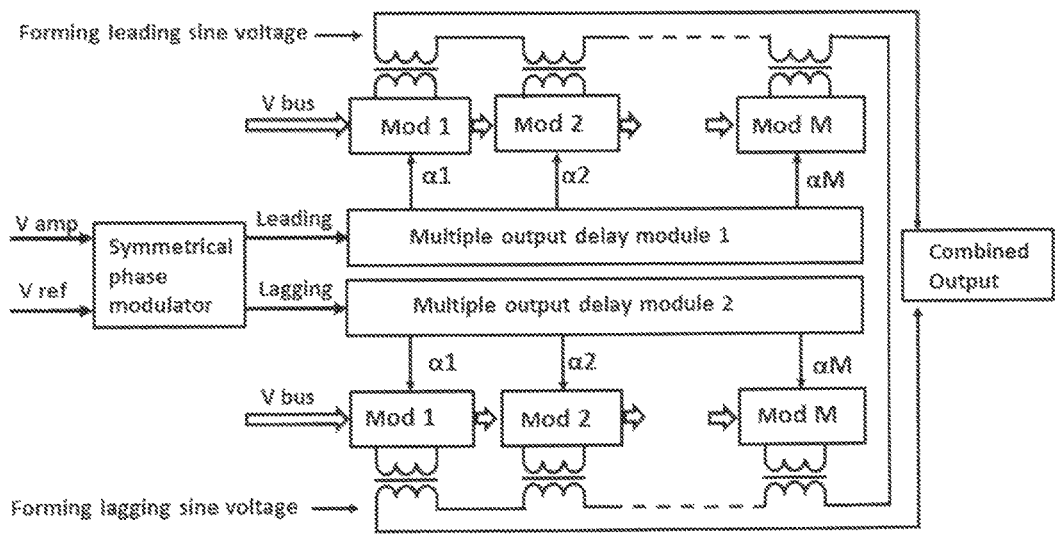
FIG. 26 shows illustrative preferred embodiment of proposed DC to AC fully regulated low harmonic converter with illustrative transformer combining method using the vector phase shift/outphasing amplitude modulation method.

FIG. 26 shows illustrative completed general topology of the DC to AC multi-vector converter, operating with the fundamental frequency and capable of providing fully regulated quazi-sinusoidal voltage with any required harmonics cancelled. The converter comprises two sets of M power modules (PM) with fixed delays $\alpha 1$ to $\alpha M$, a single symmetrical phase shift modulator and the means for combining all modules outputs. Symmetrical phase shift modulator has at least two inputs—first connected to the reference signal V ref, defining the fundamental frequency, and second connected to the signal V amp, controlling the amplitude of the resulting output voltage—and two modulator outputs (leading and lagging) with the phase shift depending on the required output voltage amplitude, both connected to the first and second module set inputs via multiple output delay modules 1 and 2 respectively. When output voltage should be maximal, Vamp, controlling output voltage, is maximal, and the phase shift between lagging and leading signals at the modulator outputs is zero. Combined output voltage delivered to the load is twice higher than a single leading or lagging voltages. To decrease load voltage, leading and lagging voltages get symmetrical phase shift which changes output voltage amplitude without changing the phase. Spectrum of the combined voltage during the process of amplitude regulation remains the same.

Control circuitry needs only one variable phase shift modulator with two outputs.

Due to fixed phase shift, both multiple output delay modules may be implemented as simple analog or digital delay circuitry requiring minimum of computational power if any.

Figure 27:
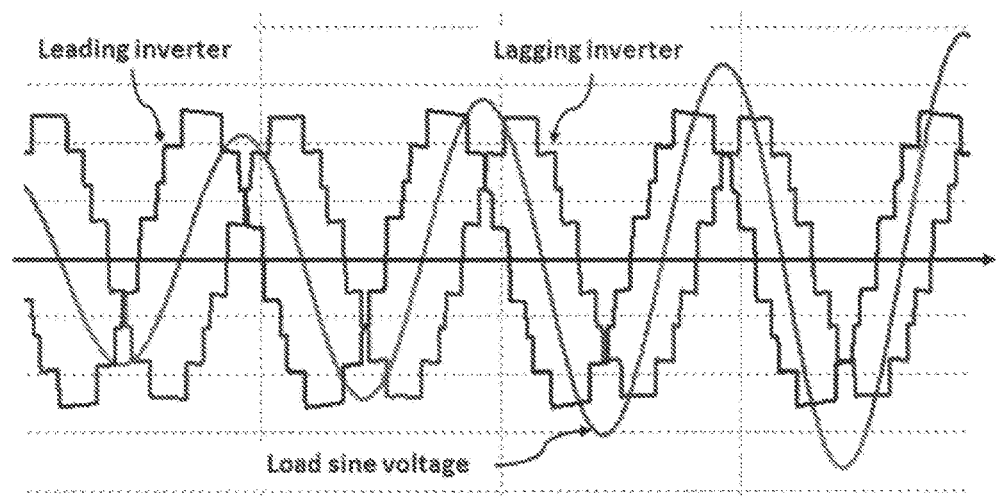
FIG. 27 shows illustrative waveforms of leading inverter and lagging inverter signals and a resulting load sine voltage based on FIG. 26 configuration.

FIG. 27 is self-explanatory and shows phase shifted leading and lagging voltages as of FIG. 26 converter with harmonics $3^{rd}$, $5^{th}$ and $7^{th}$ cancelled and resulting output sine voltage being restored on the resonant load; the amplitude of the load voltage changes as the variable phase shift decreases.

The overall idea of the above disclosed principles is to use multiple high efficiency switch mode converters with unfortunately rich output spectrum, to arrange two sets of DC to AC converters with fixed delay controls to clean-up unwanted harmonics from the output voltage spectrum and leave only the fundamental harmonics, and then to apply the outphasing amplitude control to regulate combined output voltage.

Unwanted harmonics shall be cancelled prior to outphasing amplitude regulation.

Multimodule DC to AC converter modules may have their DC inputs connected in parallel to the DC bus or connected in series allowing DC voltage sharing between modules. This is essential for HVDC applications that involve a conversion of very high DC voltage into AC with low harmonic content. DC inputs may be connected into groups or series of groups combining, for example, leading and lagging individual modules to optimize their DC bus currents.

Numerous other modifications, equivalents, and alternatives, will become apparent to those skilled in the art once the above disclosure is fully appreciated. Individual module may employ full bridge or half bridge configuration, for example two half bridges operating with proper shift may form its output voltage with cancelled one of the odd harmonics, for example third, depending upon their phase shift and thus decreasing the total number of switching elements. It is intended that the following claims be interpreted to embrace all such modifications, equivalents, and alternatives where applicable.

REFERENCES

[1] U.S. Pat. No. 6,697,271—"Cascaded multilevel H-bridge drive", Keith Allen Corzine, priority Aug. 16, 2000, published Feb. 24, 2004
[2] U.S. Pat. No. 3,867,643—"Electric power converter", Baker Richard, Bannister Lawrence, Priority Jan. 14, 1974, published Feb. 18, 1975
[3] U.S. Pat. No. 5,642,275—"Multilevel cascade voltage source inverter with separate DC sources', Fang Zhen Peng, Jih-Sheng Lai, priority Sep. 14, 1995, published Jun. 24, 1997.
[4] U.S. Pat. No. 8,395,280—"Circuit arrangement including a multi-level converter", Dusan Graovac, Andreas Pechlaner, Benno Koepl, priority Feb. 16, 2010, published Mar. 12, 2013.
[5] H. Chireix, "High power outphasing modulation," Proc. IRE, Vol. 23, No 11, pp. 1370-1392, November 1935.
[6] U.S. Pat. No. 6,133,788, "Hybrid Chireix/Doherty Amplifiers and Methods", P. Wilkinson Dent.", priority Apr. 2, 1998, published Oct. 17, 2000.
[7] US 2013/0176140, "Enhanced Transmitter and Method for a Nuclear Magnetic Resonance Logging Tool" Alexey Tyshko, priority Jan. 10, 2012, Published Jul. 11, 2013

I claim:
1. A DC to AC converter that comprises:
a first set of M switch mode modules generating a first set of M identical amplitude and waveform pulses with specific phase shift and summation of generated output pulses;
a second set of M switch mode modules generating a second set of M identical amplitude and waveform pulses with specific phase shifts and summation of generated output pulses for the second set of M;
a phase shift controller producing a first set of M control pulses for the first set of M switch mode modules and a second set of M control pulses for the second set of M switch mode modules, wherein the phase shift for each module in the first set and each module in the second set is a sum of two components: a fixed shift in reference to the first module within the set and a variable and depending on the required amplitude of the AC voltage at the output of the converter, wherein a number of modules M in each of first set and the second set is based on total number N of high odd harmonics to be cancelled as $M=^N$, and wherein, within each of the first set and the second set, the phase shift for each module $\alpha_m$ in reference to the first module is fixed and calculated as a scalar product of two vectors: one of which is a vector with assigned binary code of the module $c_m$, equal to the module number minus one, and the other is a vector of phase shifts $\Phi=\{\phi_n\}$ of all harmonics to be cancelled, where $\phi_n$ is a phase shift for cancelling $n^{th}$ harmonic and is calculated as $\phi_n = \pi/n$.

2. The DC to AC converter of claim 1, wherein the phase shift controller produces two sets of symmetrically phase shifted control pulses to maintain the resulting AC output voltage phase stable within the full range of amplitudes.

3. The DC to AC controller of claim 1, wherein the variable phase shift component is produced by the phase shift modulator with at least a first input connected to the reference voltage defining operating frequency and phase, and a second input connected to the signal defining the amplitude of the combined output voltage, and two outputs connected to the multiple output delay modules providing fixed phase shifted control signals for two module sets.

4. The DC to AC converter of claim 1, wherein DC inputs on the switch mode modules are connected to DC bus in series.

* * * * *